US005909373A

United States Patent [19]
Sansone et al.

[11] Patent Number: 5,909,373
[45] Date of Patent: *Jun. 1, 1999

[54] SYSTEM FOR DISCOUNTING POSTAGE FOR A POSTAGE KIOSK CONTAINING A FRANKING MACHINE

[75] Inventors: Ronald P. Sansone, Weston; George B. Harvey, New Canaan, both of Conn.

[73] Assignee: Pitney Bowes Inc., Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,141

[22] Filed: Sep. 3, 1996

[51] Int. Cl.[6] ..................... G06F 15/20

[52] U.S. Cl. ..................... 364/479.08; 705/403

[58] Field of Search ..................... 364/478.01, 478.04, 364/478.06, 479.01, 479.05, 479.06, 479.08; 705/16, 17, 20, 30, 32, 400–411

[56] References Cited

U.S. PATENT DOCUMENTS

| | | | |
|---|---|---|---|
| 3,552,668 | 1/1971 | Kanno | 242/55 |
| 4,024,380 | 5/1977 | Gunn | 235/61.9 |
| 4,097,923 | 6/1978 | Eckert, Jr. et al. | 364/900 |
| 4,376,299 | 3/1983 | Rivest | 364/900 |
| 4,809,185 | 2/1989 | Talmadge | 364/464.02 |
| 4,855,920 | 8/1989 | Sansone et al. | 235/375 |
| 4,900,905 | 2/1990 | Pusic | 235/381 |
| 4,907,161 | 3/1990 | Sansone et al. | 235/375 |
| 4,911,087 | 3/1990 | Couvrette | 109/24.1 |
| 4,940,887 | 7/1990 | Sheng-Jung | 235/381 |
| 4,943,270 | 7/1990 | Fleckenstein | 493/10 |
| 4,949,272 | 8/1990 | Vanourek et al. | 705/410 |
| 5,036,472 | 7/1991 | Buckley et al. | 364/479 |
| 5,056,029 | 10/1991 | Cannon | 364/468 |
| 5,065,000 | 11/1991 | Pusic | 235/381 |
| 5,077,694 | 12/1991 | Sansone et al. | 705/406 |
| 5,132,915 | 7/1992 | Goodman | 364/479 |
| 5,146,403 | 9/1992 | Goodman | 364/401 |
| 5,191,533 | 3/1993 | Haug | 705/407 |
| 5,200,903 | 4/1993 | Gilham | 364/464.02 |
| 5,272,640 | 12/1993 | Wu | 364/464.02 |
| 5,313,404 | 5/1994 | Wu | 364/478 |
| 5,369,258 | 11/1994 | Sansone et al. | 235/381 |
| 5,457,636 | 10/1995 | Sansone et al. | 364/478 |
| 5,473,143 | 12/1995 | Vak | 235/380 |

FOREIGN PATENT DOCUMENTS

| | | | |
|---|---|---|---|
| 0 462 42 A2 | 5/1991 | European Pat. Off. | G07F 17/26 |
| 0 472 142 A2 | 8/1991 | European Pat. Off. | G07B 17/02 |

*Primary Examiner*—Paul P. Gordon
*Attorney, Agent, or Firm*—Ronald Reichman; Robert Meyer; Melvin Scolnick

[57] ABSTRACT

A postal meter is contained in a kiosk. The kiosk also contains a postage meter secure classifier; and a modem link, which communicates with a data center, that is located at a different location. The secure classifier records every time postal funds are dispensed by the postal meter and classifies the postal transactions of the postage meter into various categories, which are then stored in funds registers memory. The modem link communicates with the secure classifier and the data center, during a postage meter refill, by exchanging funds and information so that proper rebates will be applied to the kiosk owner. Thus, the data center may also be used to supply additional funds or refills to the postage meter contained within the kiosk.

14 Claims, 5 Drawing Sheets

SYSTEM FOR DISCOUNTING POSTAGE FOR A POSTAGE KIOSK CONTAINING A FRANKING MACHINE

FIELD OF THE INVENTION

The invention relates generally to kiosks, and more particularly to kiosks that dispense postal value.

BACKGROUND OF THE INVENTION

Postal kiosks are known devices whereby one is able to frank and then post mail in a convenient fashion. Such kiosks are designed to receive the mail, weigh the mail, inform the user as to the amount of postage due and upon user acceptance and payment dispense the postage. Most kiosks have convenience items such as currency and coin acceptors and coin changes. Recently, credit card slots and credit card charging mechanisms have been added to kiosks.

Current postal kiosks dispense postage by using special postal manufactured blank stamp stock and a dot matrix printer to fill in the postal amount or postal value desired by the user of the kiosk. To insure the fiscal integrity of the blank stamp stock, the United States Postal Service is currently holding each kiosk owner to value each unaccounted for stamp at $99.99. This frequently causes the kiosk owner many problems. For instance: the kiosk owner has to account for every stamp; the kiosk owner has to secure the stamps against theft or damage; and the kiosk owner has to account for stamps used during testing and maintenance of the kiosk. The foregoing process is expensive and error prone.

In order to partially compensate kiosk owners for providing the above service to the public, the United States Postal Service has been offering discounted postage, that varies with postal value, to the owner of the kiosk. Originally, this postal discount was for mechanical vending machines that dispensed stamps. Currently, the postal discount applies to franking machines. A postal meter or franking machine does not need to use United States Postal Service preprinted blank stamp stock. Thus, the inclusion of a postage meter or franking machine in a kiosk will solve the problems enumerated above. However, franking machines treat customers postage as a lump sum and do not store the postal transactions into various categories so that postal discounts may be calculated. Thus, a franking machine may not be simply included in a kiosk without some modification.

SUMMARY OF THE INVENTION

This invention overcomes the disadvantages of the prior art by providing a postal kiosk that contains a postage meter or franking machine. The kiosk also contains a postage meter secure classifier; and a modem link, which communicates with a data center, that is located at a different location. The secure classifier records every time postal funds are dispensed by the postal meter and classifies the postal transactions of the postage meter into various categories, which are then stored in funds registers memory. The modem link communicates with the secure classifier and the data center, during a postage meter refill, by exchanging funds and information so that proper rebates will be applied to the kiosk owner. Thus, the data center may also be used to supply additional funds or refills to the postage meter contained within the kiosk.

DETAILED DESCRIPTION OF THE PREFERRED EMBODIMENT

Figure 1:
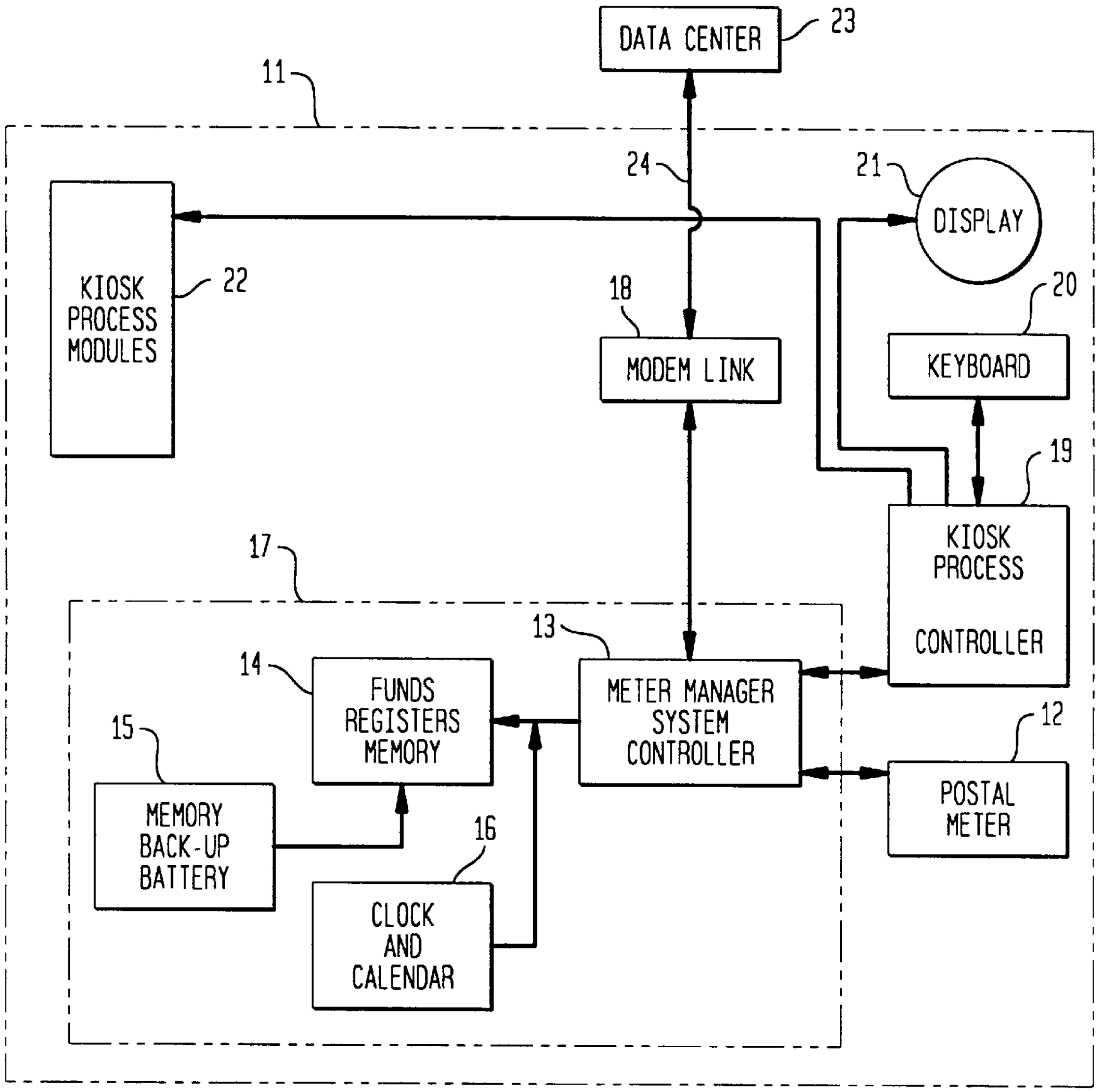
FIG. 1 is a block diagram of a kiosk.

Referring now to the drawings in detail and more particularly to FIG. 1, the reference character 11 represents a kiosk. Kiosk 11 contains: a postal meter 12; a secure classifier 17 that is coupled to meter 12; a kiosk processor controller 19; a keyboard 20 that is coupled to process controller 19, a display 21, whose input is coupled to process controller 19, kiosk process modules 22 that are coupled to kiosk process controller 19; and a modem link 18 that is coupled to secure classifier 17. Secure classifier 17 includes: a meter manager system controller 13, that is coupled to postal meter 12; funds registers memory 14, that is coupled to controller 13; a clock and calendar 16 that is coupled to memory 14; and a memory battery backup 15, that supplies back up power for memory 14.

Postage meter 12 includes an ascending register and a descending register. As is known in the art the ascending register maintains a record of all the postage dispensed by the postage meter 12 and the descending register maintains a record of the amount of postage that has been purchased by the owner of kiosk 12. Each postal transaction performed by meter 12 is communicated to meter manager system controller 13. Controller 13 classifies the postal transactions of postage meter 13 into various categories. Some of the categories are: first class mail; second class mail; third class mail; priority mail; international mail; and the place of posting. It would be obvious to one skilled in the art that the postal transactions may be classified into many other different categories. Funds registers memory 14 store each category of information received by controller 13 from meter 12. Clock and calendar 16 permits memory 14 to also store the date and time that the aforementioned postal transactions occurred.

Kiosk process modules 22 include: a voice module, a audio module, video modules, currency modules and postal calculation modules. Modules 19 is described in Sansone's U.S. Pat. No. 5,369,258 entitled "Postage Applying Kiosk" herein incorporated by reference.

Kiosk process controller 19 controls kiosk process modules 22. Controller 19 controls the weighing of the mail piece, the determining of the correct postage, and causes meter 12 to affix the correct postage to the mail piece. Process controller 19 is described in Wu's U.S. Pat. No. 5,272,640 entitled "Automatic Mail-Processing Device With Full Functions" herein incorporated by reference.

The user of kiosk 11 places the material to be mailed on a scale (not shown) and enters the classification of the material to be mailed, i.e., first class mail, second class mail, parcel post, etc. into keyboard 20. Relevant information regarding the object to be mailed is displayed on display 21.

Kiosk 11 also contains a currency receiving slot for receiving coins and bills, a currency handler for receiving payment and dispensing change and a currency return slot for returning over payments. Kiosk 11 will also have speakers that will communicate prompts to the user and a door for the purpose of allowing the postman to remove mail from kiosk 11 after meter 12 has affixed the correct postage thereto. The aforementioned items are not shown as they do not form a part of the invention except to the extend of being a part of the kiosk.

Modem link 18 communicates with data center 23 via telecommunications link 24, during a refill of postage meter 12. During a refill, funds and information will be exchanged so that proper rebates will be applied to the kiosk owner and additional funds may be added to meter 12. The time and manner in which a refill is performed is described in Rivest's U.S. Pat. No. 4,376,299 entitled "Data Center For Remote Postage Meter Recharging System Having Physically Secure Encrypting Apparatus And Employing Encrypted Seed Number Signals", herein incorporated by reference.

Figure 2:
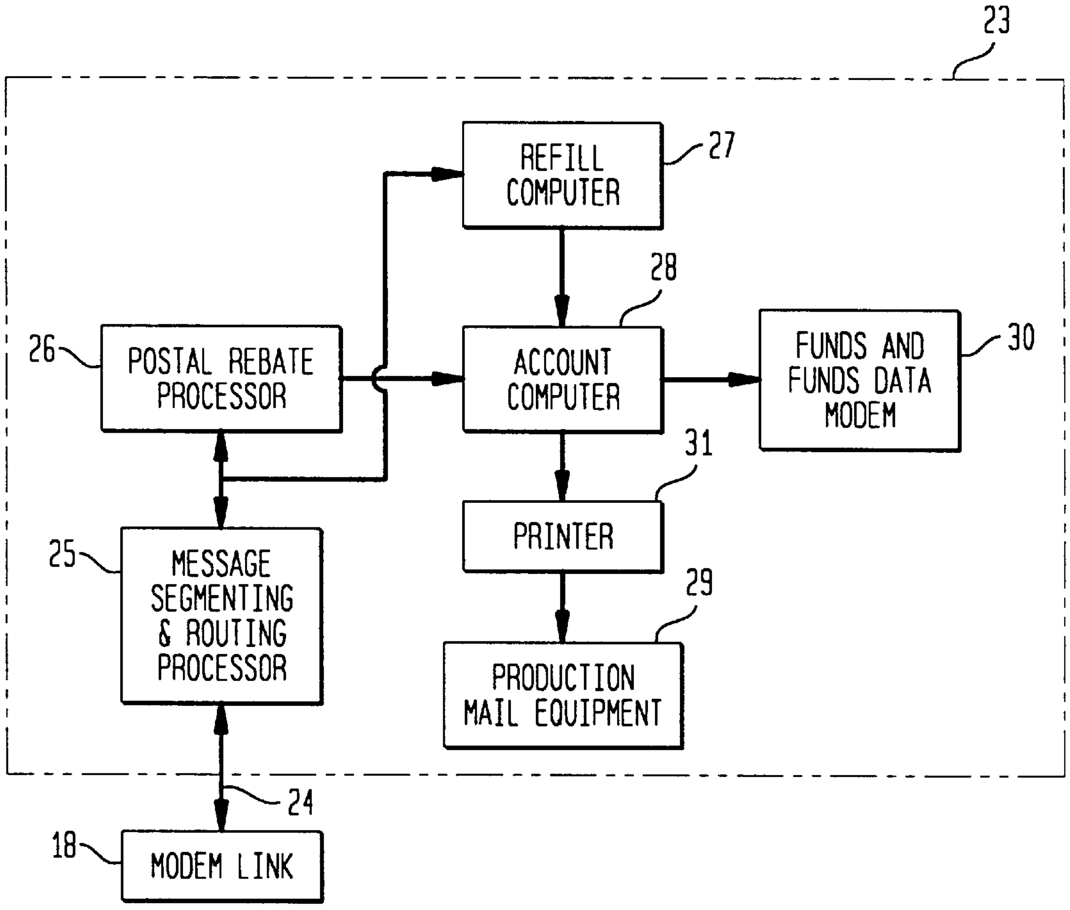
FIG. 2 is a block diagram of a data center.

FIG. 2 is a block diagram of data center 23 communicating with modem link 18 via telecommunications path 24. Data center 23 will communicate with kiosk 11 when, data center 23 detects that meter 12 (FIG. 1) has low funds; data center 23 schedules a communication; funds registers 14 (FIG. 1) are full and when an error is detected in kiosk 11 or the supplies contained in kiosk 11 are low, i.e. a small amount of ink is contained in meter 12, etc. Data center 23 includes: a message segmenting and routing processor 25, that is coupled to a postage rebate or discount processor 26 and a refill computer 27; a account computer 28 whose inputs are coupled to the outputs of postage rebate processor 26 and refill computer 27, and whose outputs are coupled to printer 31 and to funds and funds data modem 30. The output of printer 31 is coupled to production mailroom 29.

Processor 25 divides the messages received from modem 18 into various elements. Then, processor 25 routes, the refill requests received from kiosk 11 to computer 27 and the postal transaction categories that were stored in funds registers 14 (FIG. 1) to postage rebate processor 26. The manner in which refill computer 27 performs the refill process is described in Rivest's U.S. Pat. No. 4,376,299 entitled "Data Center For Remote Postage Meter Recharging System Having Physically Secure Encrypting Apparatus And Employing Encrypted Seed Number Signals", herein incorporated by reference.

Postage rebate processor 26 will receive the following information from kiosk 11: the identification number of meter 12; the identification number of kiosk 11; the time and date of each postal transaction; and the type of each postal transaction. Processor 26 will also receive periodic discount rate data updates from the post and periodic mailer contract updates from the post. The manner in which processor 26 performs the foregoing will be more fully described in the description of FIG. 5.

Figure 4:
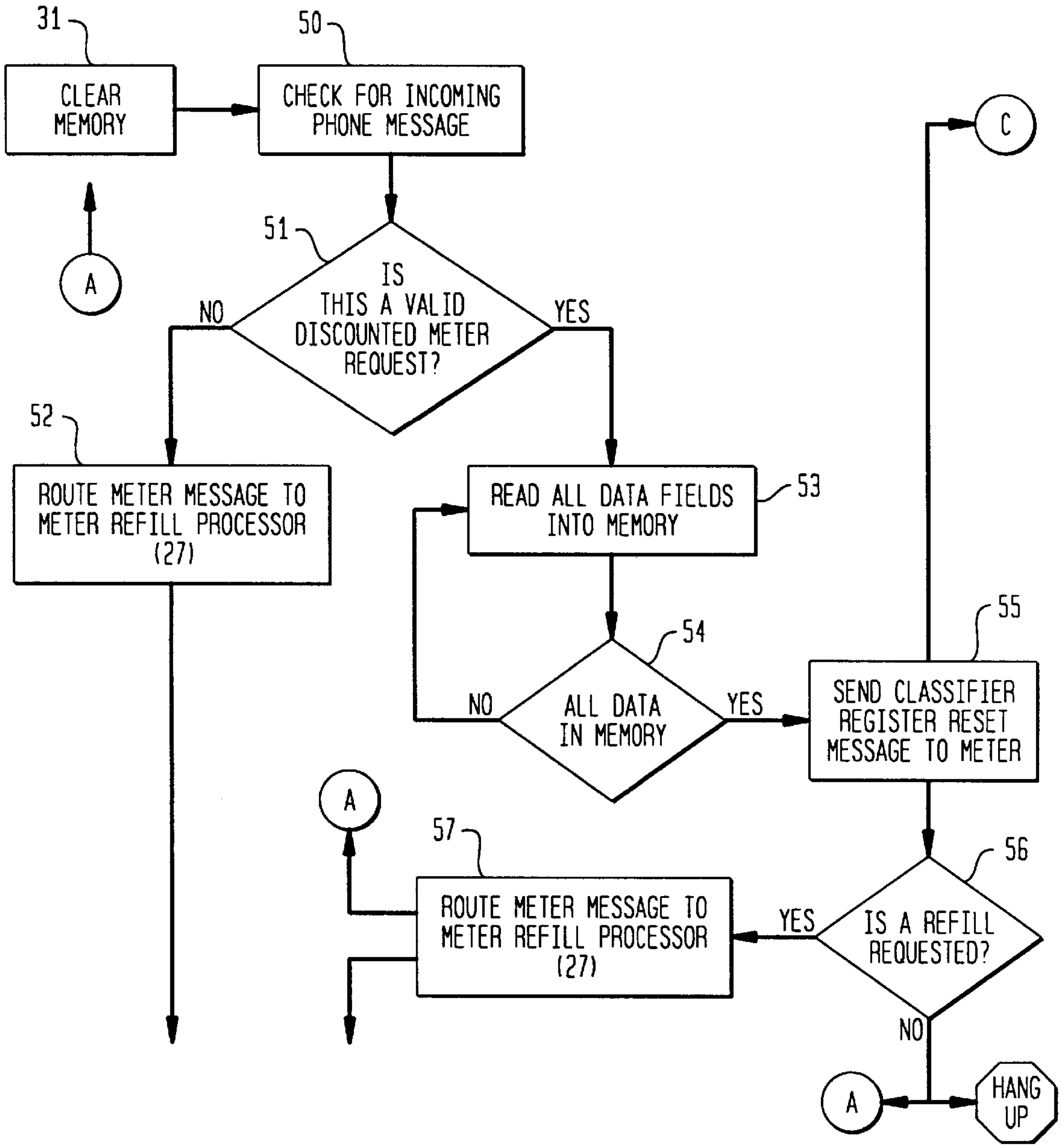
FIG. 4 is a flow chart showing the operation of message segmenting and routing processor 25 of FIG. 2.

Account computer 28 uses the information obtained from postage rebate processor 26 and refill computer 27 and the flow chart described in the description of FIG. 4 to generate account reports that indicate the amount of postage issued by meter 12 together with the rebate that should be applied to meter 12. The manner in which account computer 28 performs the accounting is described in Eckert's U.S. Pat. No. 4,097,023 entitled "Remote Postage Meter Charging System Using An Advanced Microcomputerized Postage Meter", herein incorporated by reference. Computer 28 will also determine the amount of funds placed in the registers of meter 12 and the amount of funds paid the owner of kiosk 11. Computer 28 will also determine the amount of money owed to the owner of kiosk 11. Computer 28 may communicate the amount of money owed to the owner of kiosk 11 via modem link 30. Modem link 30 may wire the aforementioned amount of money to a bank account selected by the owner of kiosk 11 or to an account selected by the post.

Account computer 28 may cause printer 31 to print a report containing the foregoing information. The report generated by printer 31 may be sent to production mail room 29. Production mail room 29 will prepare for mailing the reports generated by printer 31. One report may be mailed to the post and the second report may be mailed to the owner of kiosk 11. Production mail room 29 may contain the Paragon® Mail Processor manufactured by Pitney Bowes Inc.

Figure 3:
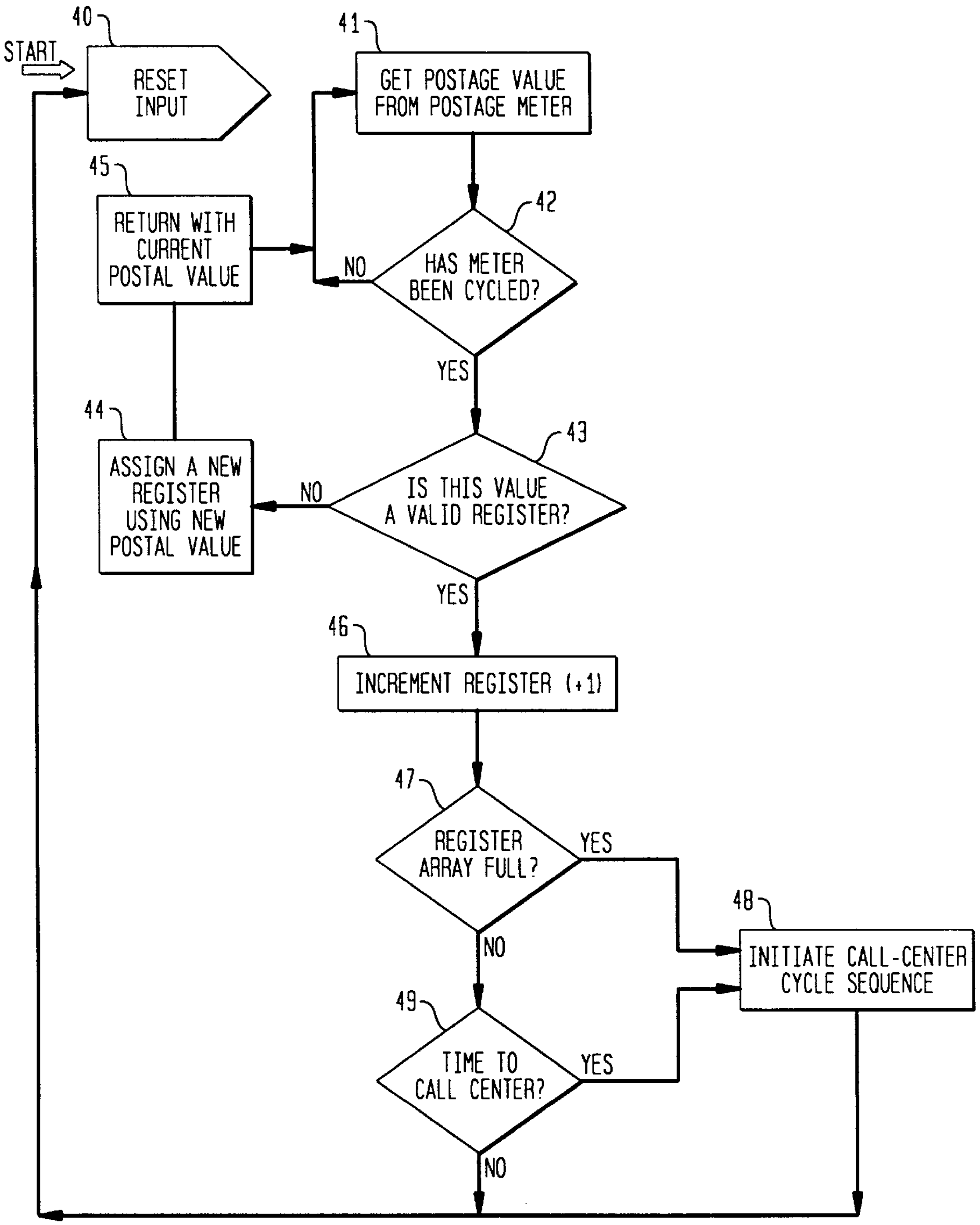
FIG. 3 is a flow chart showing the operation of meter manager system controller 13 of FIG. 1.

FIG. 3 is a flow chart showing meter manager system controller 13 of FIG. 1. The program begins at start and proceeds to reset input in block 40. Then, the program goes to block 41 to get the postage value from postage meter 12. Now, the program goes to decision block 42 to determine whether or not postage meter 12 has been cycled. In another words has the postage meter registers changed values. If, the registers of postage meter 12 have not changed values then and in that event the program proceeds back to block 41 to obtain a new postage value. If, postage meter 12 has changed values, then the program proceeds to decision block 43. Block 43 determines whether or not the value in the register is a valid postal value. That is, whether or not postage has been disseminating having the stored register value. If, the value in the register is not a recognized postal value, then the program proceeds to block 44. In block 44 the program assigns a new register using the new postal value, i.e. the new value is set in that register. Then, the program proceeds to block 45 to return with the current postal value. Then, the program proceeds back to block 41 to get the postage value from postage meter 12, i.e., the next postage value. If, decision block 43 determines that the value is a valid register value, then and in that event the program proceeds to block 46 to increment the register value by one. At this juncture the program proceeds to decision block 47 is the register array full. If, the register array is not full, then in that event, the program proceeds to decision block 49 to determine whether it is time to call data center 23. If, it is not time to call data center 23, then the program proceeds to reset input in block 40. If, it is time to call data center 23 then, the program proceeds to block 48 initiate call center cycle sequence. If, decision block 47 determines that the register array is full then, the program proceeds to block 48 initiate call center cycle sequence. Then, the program proceeds back to reset input in block 40.

FIG. 4 is a flow chart showing the operation of the message segmenting and routing processor 25 of FIG. 2. In block 31 the program clears the memory and proceeds to block 50 to check for incoming telephone messages. When a message is received the program proceeds to decision block 51. In decision block 51 the program determines whether or not a valid discounted message was received from postage meter 12. If, a valid discounted postage meter message was not received the program proceeds to block 52. In block 52 the message is routed to meter refill processor 27 (FIG. 2). After routing the message to meter refill processor 27, the program goes to block 31 clear memory. Then the program waits for the next telephone message in block 50. If, block 51 determined that a valid discounted meter message was present, then the program proceeds to block 53 read all valid data fields into memory. The valid or variable data fields are the number of mailpieces of a particular value meter 12 has recorded together with the number and type of supplies ordered for the particular kiosk. After reading the aforementioned data into memory the program proceeds to decision block 54. Decision block 54 determines whether or not all variable data fields have been read into memory. If, all variable data fields have not been read into memory then the program proceeds back to block 53. If the answer in decision block 54 was affirmative the program proceeds to block 55 send variable register reset signal. Now the registers containing the number of mailpieces of particular values that the meter has been recorded and the number and type of supplies in which the kiosk ordered are cleared. Now the program proceeds to decision block 56. In decision block 56 the program determines whether or not a refill has been requested. If, a refill has not been requested then the program proceeds to hang up and clear memory block 31. If, a refill has been requested then the program proceeds to block 57 entitled route to refill computer 27. The program also goes back to block 31 clear memory and block 50 to check for incoming telephone messages. When, all variable data fields have been read into memory the program also proceeds to block 55 to send classifier register reset message to meter 12. Then the program process the program contained within postage rebate processor 26, which is more fully described in the description of FIG. 5.

Figure 5:
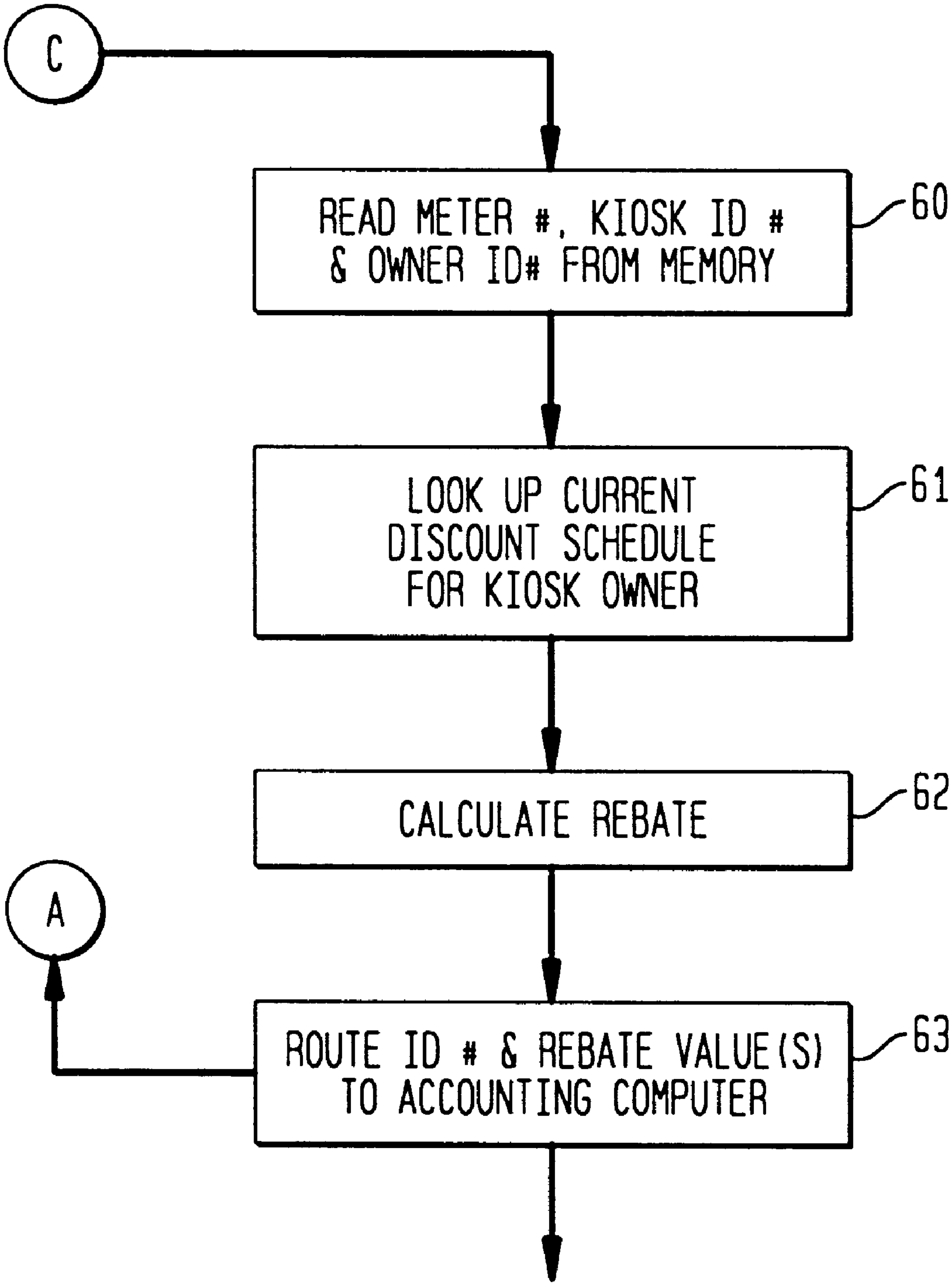
FIG. 5 is a flow chart showing the operation of postage rebate processor 26 or FIG. 2.

FIG. 5 is a flow chart showing the operation of postage rebate processor 26 of FIG. 2. The input to block 60 entitled read meter number, kiosk identification number and source from memories comes from the affirmative output of decision block 54 of FIG. 4. After reading the applicable data the program proceeds to block 61 entitled look up current discount for kiosk owner. After looking up the current information the program proceeds to block 62 calculate rebate. In this block the appropriate rebate is calculated. Now, the program proceeds to block 63 route values to accounting computer 28. At this juncture the values calculated are routed to account computer 28 of FIG. 2. The program also goes back to block 50 of message segmenting and routing processor 25 to wait for the next telephone call.

The above specification describes a new and improved kiosk and data center. The kiosk contains a postage meter that is able to be refilled from a remote data center that receives information regarding the postage meters transactions so that discounts may be given to the owner of the kiosk.

It is realized that the above description may indicate to those skilled in the art additional ways in which the principles of this invention may be used without departing from the spirit. It is, therefore, intended that this invention be limited only by the scope of the appended claims.

What is claimed is:

1. A postal funds management system that utilizes a data center to recharge postage meters, contained in remotely located kiosks, with additional postage and applies postal discounts to the postage meters, said system comprising:

means for securely classifying and storing the postal transactions of the postage meters into various categories;

means for communicating the various categories of postal transactions to the data center and;

means located in the data center coupled to the communicating means for applying the correct discounts rebated to the postage meter after postage has been applied by the postage meter during a recharge of the postage meter.

2. The system claimed in claim 1, wherein the means for communicating comprises:

a modem link; and a telecommunications network that couples the modem link to the data center and to the classifying means.

3. The system claimed in claim 1, wherein the classifying means comprises:

a modem link; and a telecommunications network that couples the modem link to the data center and to the classifying means during the postage meter refill.

4. The system claimed in claim 1, wherein the means for classifying comprises:

a computer that categorizes the postal transactions of the postage meter;

a memory coupled to the computer that stores each categorized postal transaction; and a clock and calendar coupled to the computer and the memory, wherein, the clock and calendar indicates the date and time each categorized postal transaction occurred.

5. The system claimed in claim 3, wherein the means for applying the correct discounts comprises:

a routing computer that separates meter refill requests from the various categories of postal transactions; and a postal discount computer that receives periodic rate data updates from the post and the categories of postal transactions from the routing computer, wherein the discount computer applies the rate data to each of the postal transactions to determine the proper discount for each postal transaction.

6. The system claimed in claim 5, further including:

a refill computer that receives refill requests from the routing computer and determines the monetary amount of postage refilled into the postage meter and the monetary amount of postage used by the postage meter.

7. The system claimed in claim 6, further including:

an account computer coupled to the refill computer and the postal discount computer, the account computer generates an account report that indicates the amount of postage issued by the meter, the discounts that should be applied to the meter, the amount of funds refilled into the meter, and the amount of funds used by the meter.

8. The system claimed in claim 6, further including:

an account computer coupled to the refill computer and the postal discount computer, the account computer generates an account report that indicates the amount of postage issued by the meter, the discounts that should be applied to the meter, the amount of funds refilled into the meter; the amount of funds used by the meter; and the amount of funds owed to or owed by the owner of the meter.

9. The system claimed in claim 8, further including:

a second modem link coupled to the account computer and a telecommunications network; and a fiduciary computer coupled to the telecommunications network, wherein, the account computer deposits in the fiduciary computer the amount of money owed to the owner of the meter.

10. The system claimed in claim 8, further including:

a printer that prints the report generated by the account computer and addresses an envelope to the post.

11. The system claimed in claim 10, further including:

production mail equipment coupled to the printer, the production mail equipment inserts the report into the envelope, and applies the correct postage to the envelope.

12. The system claimed in claim 8, further including:

a printer that prints the report generated by the account computer and addresses an envelope to the owner of the meter.

13. The system claimed in claim 12, further including:

production mail equipment coupled to the printer, the production mail equipment inserts the report into the envelope, and applies the correct postage to the envelope.

14. A method of applying discounts to postage issued by postal meters located in kiosks, said method includes the steps of:

storing the postal transactions of postage meters, by type of postal transaction; and calculating discounts for each of the postal transactions rebated at a location remote from the postage meter after postage has been applied by the postage meter during a recharge of the postage meter.

* * * * *